US010136074B2

United States Patent
Tao et al.

(10) Patent No.: US 10,136,074 B2
(45) Date of Patent: Nov. 20, 2018

(54) DISTRIBUTION-POINT-BASED ADAPTIVE TONE MAPPING

(71) Applicant: Samsung Electronics Co., Ltd., Suwon-si (KR)

(72) Inventors: Li Tao, Mountain View, CA (US); Yeong-Taeg Kim, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/986,548

(22) Filed: Dec. 31, 2015

(65) Prior Publication Data

US 2016/0360171 A1     Dec. 8, 2016

Related U.S. Application Data

(60) Provisional application No. 62/170,042, filed on Jun. 2, 2015.

(51) Int. Cl.
*H04N 5/265*     (2006.01)
*H04N 9/68*     (2006.01)

(52) U.S. Cl.
CPC ............. *H04N 5/265* (2013.01); *H04N 9/68* (2013.01)

(58) Field of Classification Search
CPC ............ H04N 9/64; H04N 9/68; H04N 9/646; H04N 5/265; H04N 19/46; H04N 19/98; H04N 19/00545
USPC ..... 348/575, 229.1, 362; 382/232, 233, 248; 375/240.08, 240.03
See application file for complete search history.

(56) References Cited

U.S. PATENT DOCUMENTS

| | | |
|---|---|---|
| 8,050,512 B2 | 11/2011 | Daly et al. |
| 8,446,481 B1 | 5/2013 | Geiss |
| 8,478,042 B2 | 7/2013 | Narasimba |
| 8,514,934 B2 * | 8/2013 | Ward ..................... G06T 5/009 375/240.03 |
| 8,934,726 B2 | 1/2015 | Margerm et al. |
| 8,964,060 B2 | 2/2015 | Levoy et al. |
| 8,988,552 B2 | 3/2015 | Atkins |
| 9,288,489 B2 * | 3/2016 | Mertens ................ H04N 19/46 |
| 2005/0169519 A1 | 8/2005 | Minakuti et al. |
| 2009/0067713 A1 | 3/2009 | Chen et al. |
| 2012/0147953 A1 | 6/2012 | El-Mahdy et al. |

(Continued)

FOREIGN PATENT DOCUMENTS

WO     WO2014135901 A1     9/2014

OTHER PUBLICATIONS

Bennett, E., et al. "Video Enhancement Using Per-Pixel Virtual Exposures," Proceedings of ACM SIGGRAPH, vol. 24, Issue 3, Jul. 2005, pp. 845-852.

(Continued)

*Primary Examiner* — Trang U Tran

(57) ABSTRACT

A method for tone mapping includes configuring, by at least one processor, at least one tone mapping function based on a measure of a distribution of luminance values within video data. The measure of a distribution of luminance values represents a luminance level at which a predetermined percentage of pixels of the video data have luminance values satisfying a threshold condition. The method includes generating a tone mapped video by applying the at least one configured tone mapping function to the video data.

20 Claims, 10 Drawing Sheets

(56) References Cited

U.S. PATENT DOCUMENTS

| | | |
|---|---|---|
| 2012/0314944 A1 | 12/2012 | Ninan et al. |
| 2014/0044372 A1 | 2/2014 | Mertens |
| 2014/0225992 A1 | 8/2014 | McDowall |
| 2014/0247870 A1 | 9/2014 | Mertens |
| 2015/0007243 A1 | 1/2015 | Kunkel et al. |
| 2015/0117791 A1 | 4/2015 | Mertens |
| 2015/0201222 A1 | 7/2015 | Mertens |
| 2015/0221280 A1 | 8/2015 | Van Der Vleuten |
| 2015/0245043 A1 | 8/2015 | Greenebaum et al. |

OTHER PUBLICATIONS

Foreign Communication From a Related Counterpart Application, PCT Application No. PCT/KR2016/010799, International Search Report and Written Opinion dated Jan. 11, 2017, 11 pages.

\* cited by examiner

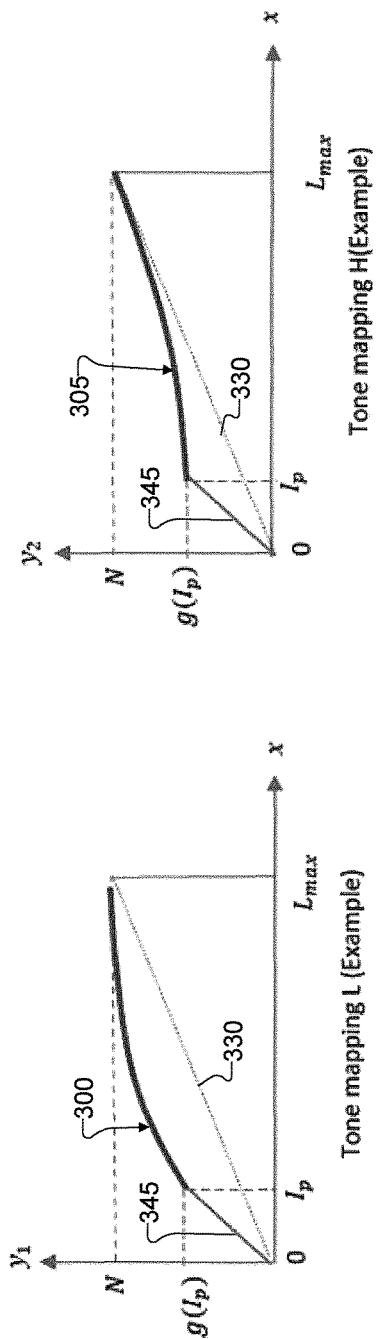
FIGURE 3A
FIGURE 3B
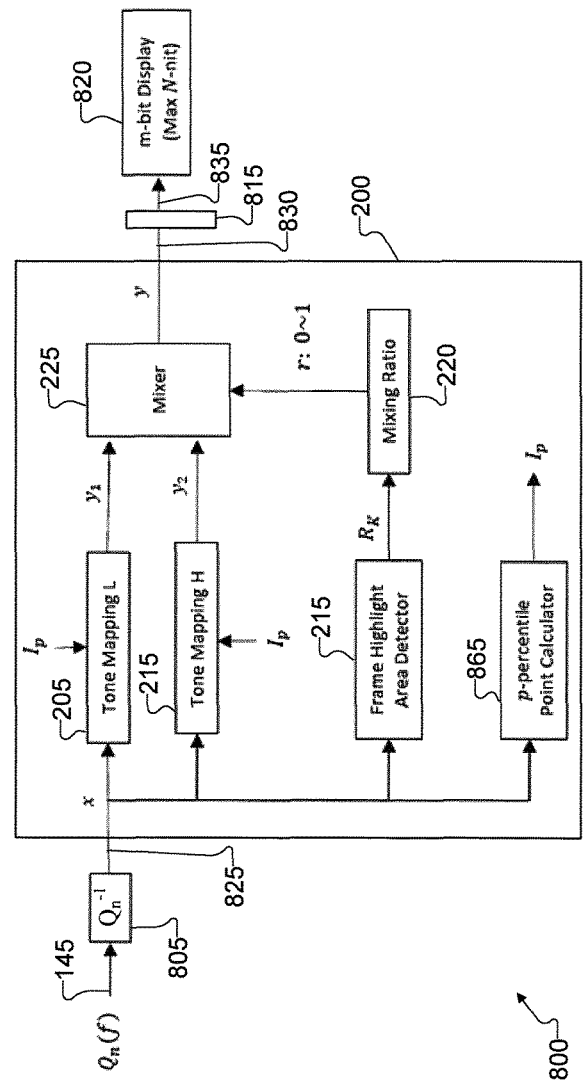
FIGURE 8

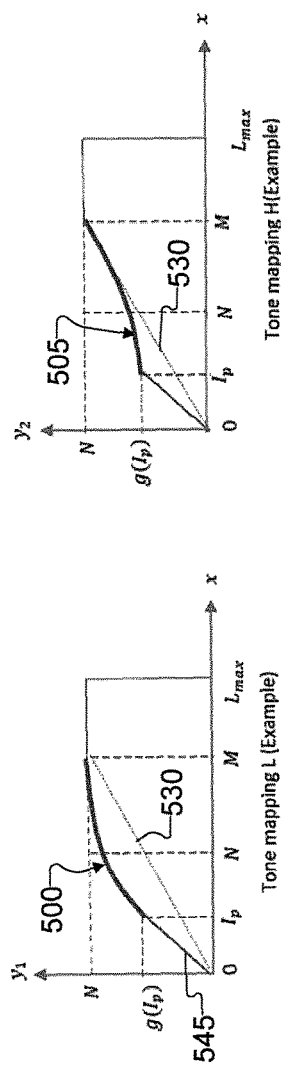
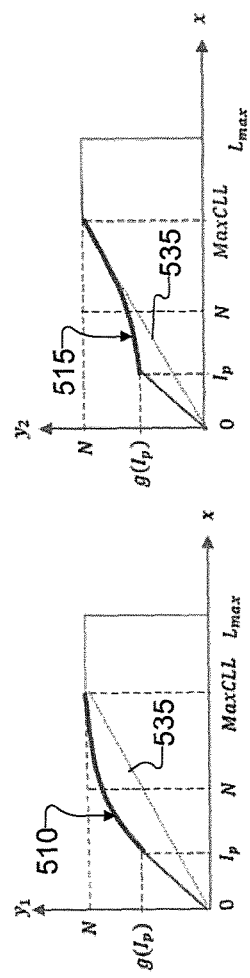
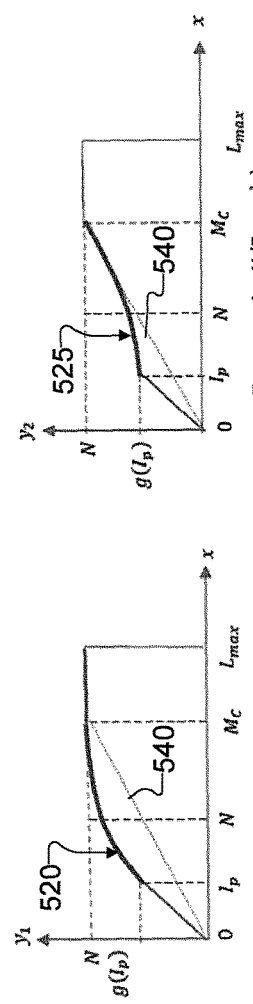
FIGURE 5A  FIGURE 5B
FIGURE 5C  FIGURE 5D
FIGURE 5E  FIGURE 5F

DISTRIBUTION-POINT-BASED ADAPTIVE TONE MAPPING

CROSS-REFERENCE TO RELATED APPLICATION(S) AND CLAIM OF PRIORITY

This application claims priority under 35 U.S.C. § 119(e) to U.S. Provisional Patent Application No. 62/170,042 filed on Jun. 2, 2015, entitled "High Dynamic Range Tone Mapping." The content of the above-identified patent document is incorporated herein by reference.

The present application is related to U.S. patent application Ser. No. 14/992,961 filed Jan. 11, 2016, entitled "Tonal-Zone Adaptive Tone Mapping;" U.S. patent application Ser. No. 14/986,557 filed Dec. 31, 2015, entitled "Adaptive Tone Mapping Based on Local Contrast;" and U.S. patent application Ser. No. 14/986,553 filed Dec. 31, 2015, entitled "Dual Band Adaptive Tone Mapping." The content of each of these patent documents is incorporated herein by reference.

TECHNICAL FIELD

This disclosure relates generally to image processing. More specifically, this disclosure relates to distribution-point-based adaptive tone mapping.

BACKGROUND

At a studio, users can produce mastered videos at different mastering monitor peak luminance (brightness) levels targeting home videos, theatres, smartphones, and the like because target devices (i.e., home display device, theatre display device, smartphone, and the like) have different values of M(nit).

As an example, a studio that has already mastered a movie with a mastering monitor having maximum luminance level of M has the mastered file, namely $f_M$, which includes a mastered video. In this example, users may want to have a mastered video at different peak luminance level of N-nit (assume N<M). In such case, users have two options: (i) re-mastering; or (ii) tone mapping.

The re-mastering option uses an N-nit mastering monitor with the original video file, namely F, to create a mastered video. Hence, the option duplicates the workflow of generating the mastered file $f_M$ in order to generate the remastered file $f_N$, which includes a re-mastered video. This re-mastering process can (i) provide a high quality; and/or be costly.

The tone mapping option can be referred to as a down tone mapping method. The tone mapping option uses the already mastered video $f_M$ with algorithms or software to generate a tone mapped video $f_M^N$. This tone mapping process can (i) save time and cost; and/or (ii) produce unsatisfactory results such as saturation of highlighted objects or scenes.

SUMMARY

This disclosure provides distribution-point-based adaptive tone mapping.

In a first embodiment, a method for tone mapping is provided. The method includes configuring, by at least one processor, at least one tone mapping function based on a measure of a distribution of luminance values within video data. The measure of a distribution of luminance values represents a luminance level at which a predetermined percentage of pixels of the video data have luminance values satisfying a threshold condition. The method includes generating a tone mapped video by applying the at least one configured tone mapping function to the video data.

In a second embodiment, an apparatus for tone mapping is provided. The apparatus includes at least one processor configured to configure at least one tone mapping function based on a measure of a distribution of luminance values within video data. The measure of a distribution of luminance values represents a luminance level at which a predetermined percentage of pixels of the video data have luminance values satisfying a threshold condition. The at least one processor is configured to generate a tone mapped video by applying the at least one configured tone mapping function to the video data.

In a third embodiment, a non-transitory computer readable medium embodying a computer program is provided. The computer program includes computer readable program code that when executed causes at least one processing device to configure at least one tone mapping function based on a measure of a distribution of luminance values within video data. The measure of a distribution of luminance values represents a luminance level at which a predetermined percentage of pixels of the video data have luminance values satisfying a threshold condition. The computer program includes computer readable program code that when executed causes at least one processing device to generate a tone mapped video by applying the at least one configured tone mapping function to the video data.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), BLUE-RAY disc, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc, an erasable memory device, static RAM, dynamic RAM, or flash memory.

Various functions described below can be implemented or supported by a processor coupled to a computer readable medium storing one or more computer programs. As such, the processor is a special purpose processor for performing the functions defined by the one or more computer programs.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 3A and 3B examples of tone mappings which may be utilized for tone mappings in one or more embodiments of this disclosure;

FIGS. 5A, 5B, 5C, 5D, 5E, and 5F illustrate examples of tone mappings configured based on metadata and a distribution-point ("p-percentile point") which may be utilized for tone mappings in one or more embodiments of this disclosure;

FIG. 8 illustrates an example a video display that implements p-percentile point adaptive tone mapping according to this disclosure;

DETAILED DESCRIPTION

FIGS. 1 through 15, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

According to various embodiments of this disclosure, systems and methods apply a mix of two or more tone mappings to video data, such as video date within a video file. For example, a low tone mapping expands shadow tones by compressing highlight tones, and a high tone mapping provides more headroom for highlight tones by compressing lower tones. Examples of lower tones include midtones and shadow tones. By mixing, an intermediate tone mapping can be achieved dynamically. The amount of mixing of the tone mappings depends at least partly on a measure of a particular tonal zone (e.g., black tones, shadow tones, mid-tones, highlight tones, white tones) of one or more frames.

Additionally or alternatively, systems and methods according to embodiments of this disclosure further the tone mappings based on a measure of the distribution of the histogram of the video content. For example, a p-percentile point of a scene or a frame can be calculated and the multiple tone mappings can be adjusted based on the p-percentile point to account for the portion of the majority of the tonal range that the scene or frame includes. In this way the combined tone mapping can be varied dynamically based on the content to achieve an efficient use of the dynamic range of a display that renders images to a viewer.

Systems and methods according to embodiments of this disclosure include one or more applications of tone mapping of images, graphics, and/or video (collectively referred to simply as "video" herein) to facilitate remastering content and/or to facilitate high dynamic range (HDR) display. In certain embodiments a tone mapping facilitates HDR remastering to different luminance peak levels. In certain embodiments the tone mapping facilitates tone mapping for a display having a different luminance peak level than that of the mastering monitor. Various embodiments disclosed herein can be used either alone or in combination.

Figure 1A:
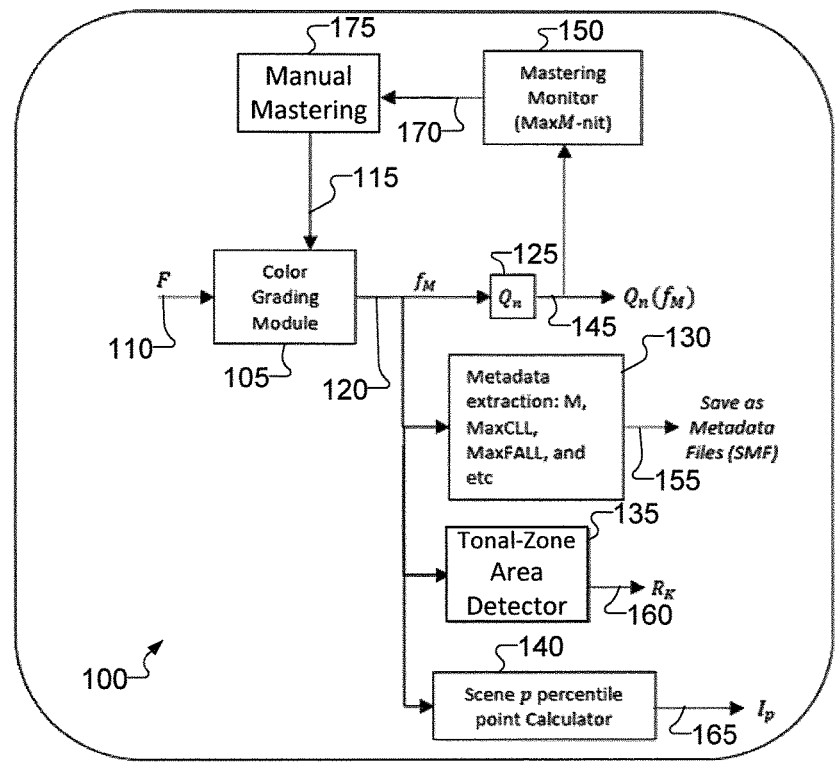
FIG. 1A illustrates an example video mastering system according to this disclosure; The mastering process 1100 generates scene highlight area information ($S_K$) of particular tonal zone and a Scene distribution-point ("p-percentile point")

FIG. 1A illustrates an example video mastering system 100 according to this disclosure. The video mastering system 100 can implement a movie mastering process associated with a movie studio. The video mastering system 100 generates scene highlight area information ($S_K$) of particular tonal zone and a Scene distribution-point ("p-percentile point").

In the video mastering system 100, a color grading module 105 receives input 110 of an original video file F to be mastered or re-mastered. In the case of mastering, the input 110 includes raw data from a camera, which has not been previously mastered. In the case of re-mastering, the input 110 includes a previously mastered video file. The color grading module 105 receives user input 115 representing user color grades of the original video F. That is, a user color grades an input master video by using a color grading module 105. The color grading module 105 generates a mastered video file 120 ($f_M$) from the input 110 by using the user input 115. The mastered video file 120 can be saved in a memory or storage. The color grading module 105 outputs the mastered video file 120, which is input to each of: (i) a quantizer 125 ($Q_n$), (ii) a metadata extraction module 130, (iii) a tonal-zone area detector 135, and (iv) a distribution-point ("p-percentile point") calculator 140.

The quantizer 125 generates and outputs a quantized mastered video file 145 ($Q_n(f_M)$) by applying a quantization function to the mastered video file 120. The quantized mastered video file 145 can be saved in a memory or storage. The quantized mastered video file 145 is input to a mastering monitor 150. The quantized mastered video file 145 includes an n-bit format.

The metadata extraction module 130 generates and outputs metadata 155 linked to the mastered video file 120. The metadata 155 can be a save as metadata file (SMF) that is saved as a separate file in correspondence with the mastered video files. The metadata extraction module 130 can extract various values from the mastered video file 120, including but not limited to: (i) a maximum luminance level of the mastering monitor 150, namely, M; (ii) a maximum contents luminance level, namely, MaxCLL; and (iii) a maximum frame average luminance level, namely, MaxFALL.

The tonal-zone area detector 135 analyzes video data in real time, generates a measure 160 (e.g., $S_K$ or $R_K$, as described below in greater detail) of a particular tonal zone of a frame or scene, and outputs the measure 160. The measure 160 can be a save as metadata file (SMF) that is saved as a separate file in correspondence with the mastered video files. The tonal-zone area detector 135 can include a frame highlight area detector that receives mastered video 120 $f_M$ as input, generates and outputs a measure $R_K$ of a particular tonal zone of a frame. The tonal-zone area detector 135 can include a scene highlight area detector that receives mastered video 120 $f_M$ as input, generates a measure $S_K$ of a particular tonal-zone of a scene of the input 110, and outputs the measure $S_K$. A scene highlight area detector can determine the measure $S_K$ in a number of ways, such as a "Average Value," a "Ratio Value," a "Max Scene Average Value," and a "Max Scene Ratio."

The team "scene" refers to a group or set of consecutive frames of the video. In certain embodiments, the set of frames can contain substantially the same background, such as in the case that a camera captures a series of frames with a slight variance due to an affine tremor of body the photographer/videographer. The set of frames corresponding to a scene can be determined based on metadata in example embodiments. However, it can be appreciated that any suitable method of determining frames of a scene can be used, such as using a predetermined number of consecutive frames and/or determining start and stop frames of a continuous recording.

A tonal zone refers to a defined region of the histogram of the scene. Examples of the tonal zones include, but are not limited to, black tones, shadow tones, mid-tones, highlight tones, white tones, and any combination or partial combination thereof. In a non-limiting example, the black tones correspond to the smallest 5% of possible luminance values, the shadow tones correspond to the lowest third of possible luminance values, the mid-tones correspond to the middle third of possible luminance values, the highlight tones can correspond to the greatest third of possible luminance values, and the white tones can correspond to the greatest 5% of the possible luminance values. For instance, in an example wherein the range of luminance values is 0-255 (e.g., 8 bit), the black tones can correspond approximately to levels 0-12, the shadow tones can correspond to levels 13-85 or 0-85, the mid-tones can correspond approximately to levels 85-169, the highlight tones can correspond approximately to levels 169-243 or 169-255, and the white tones can correspond approximately to levels 243-255. It will be appreciated that the tonal zone can correspond to any predetermined range of luminance values in alternative embodiments.

The particular tonal zone can be measured by the area under the histogram measured over the particular tonal zone. Any suitable measure, such as any suitable noun or statistic that characterizes the scene relative to the particular tonal zone can be used.

The p-percentile point calculator 140 generates a measure 165 ($I_P$) of a distribution of luminance values within video data. The measure 165 ($I_P$) can be a save as metadata file (SMF) that is saved as a separate file in correspondence with the mastered video files. The measure $I_P$ 165 can be a p-percentile point, which represents a luminance level at which a predetermined percentage of pixels of the video data have luminance values that satisfy a threshold condition, such as a condition of being less than or greater than the luminance level. For the sake of clarity, examples will be described below in the context of the threshold condition corresponding to being less than the luminance level, although it will be understood that the threshold condition can correspond to being greater than the luminance value in alternative embodiments. The video data can be a frame or a scene. The p-percentile point calculator 140 can include a scene p-percentile point calculator that calculates a scene p-percentile point 165 ($I_P$) of the mastered video file 120. More particularly, the p-percentile point calculator 140 can apply Equations 1 and 2 to the mastered video file 120 to determine the scene p-percentile point 165 ($I_P$) for a given value of p. The value of p can be equal to the percent of samples of the scene that has a luminance level less than the p-percentile point $I_P$, or can represent a selected value (e.g., 5% or 20%).

$$p = \frac{\sum_{x \in scene} 1_{x \leq I_p}}{\sum_{x \in scene} 1} \quad (1)$$

$$\text{where } 1_{x \leq I_p} = \begin{cases} 1, & \text{if } x \leq I_p \\ 0, & \text{else} \end{cases} \quad (2)$$

In certain embodiments, the p-percentile point calculator 140 includes a frame p-percentile point calculator that calculates a frame p-percentile point 165 ($I_P$) of the mastered video file 120. More particularly, the p-percentile point calculator 140 can apply Equation 3 to the mastered video file 120 to determine the frame p-percentile point 165 ($I_P$) for a given value of p. The value of p can be equal to the percent of samples of the frame that has a luminance level less than the p-percentile point $I_P$, or can represent a selected value (e.g., 5% or 20%).

$$p = \max\left(\frac{\sum_{x \in frame} 1_{x \leq I_p}}{\sum_{x \in frame} 1}\right) \quad (3)$$

The mastering monitor 150 includes a de-quantizer module ($Q_n^{-1}$) that can apply the dequantization function to the quantized mastered video file 145. The mastering monitor 150 has a maximum luminance level of M nits. The mastering monitor 150 provides visual feedback 170 to the user. However, the mastering monitor 150 may have very high contrast in comparison with a consumer display device, such as a consumer-grade television. As a result, the mastered video displayed on the mastering monitor 150 may look different than displayed on a home television set. For example, because the mastering monitor 150 can display brighter images than a home television set, the bright portions of the mastered video displayed on the home television set may clip and, thus, image details may be lost. By displaying the mastered video, the mastering monitor 150 provides visual feedback for continued or iterative adjustment of color tones for the manual mastering process in block 150.

In the manual mastering block 175, the input 110 of the original video file F may be graded using a color grading module 105. Also in the manual mastering block 175, the visual feedback 170, may be graded using a color grading module 105 for continued or iterative adjustment of color tones.

Figure 1B:
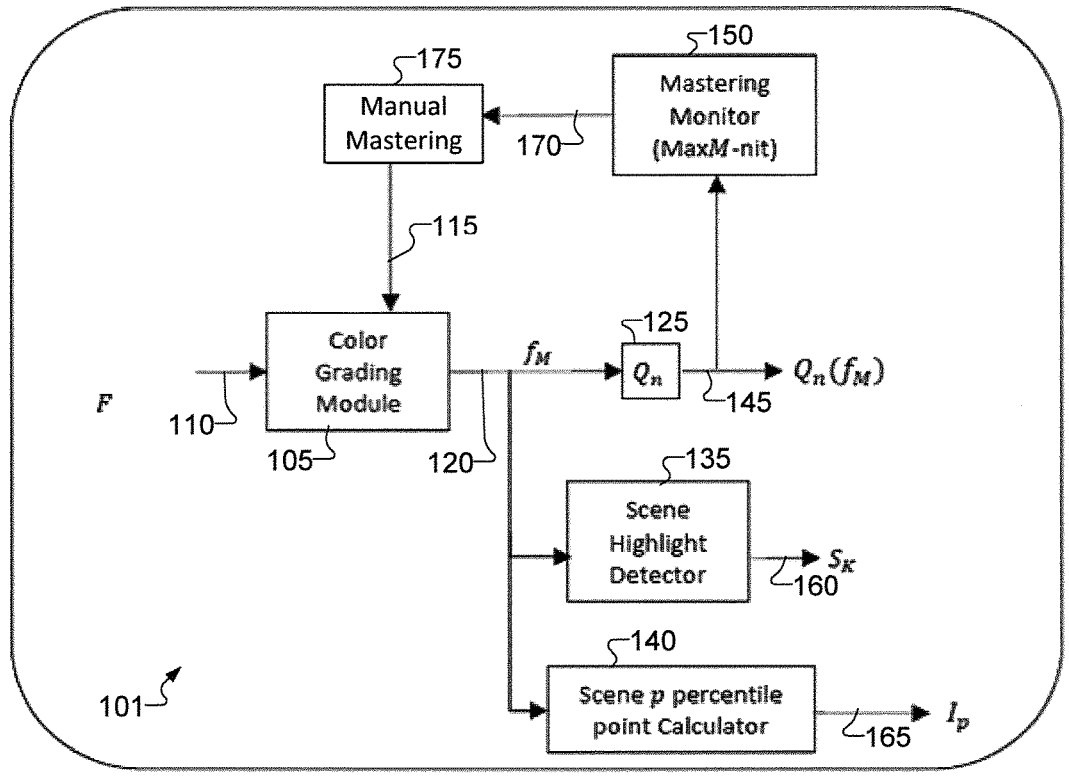
FIG. 1B illustrates the video mastering system of FIG. 1A without a metadata extraction module.

Although FIG. 1A illustrates one example of a video mastering system 100, various changes may be made to FIG. 1A. For example, other embodiments may include more, less, or different components. For example, FIG. 1B illustrates the video mastering system of FIG. 1A without the metadata extraction module 130, which is referred to herein by reference number 101.

Figure 2:
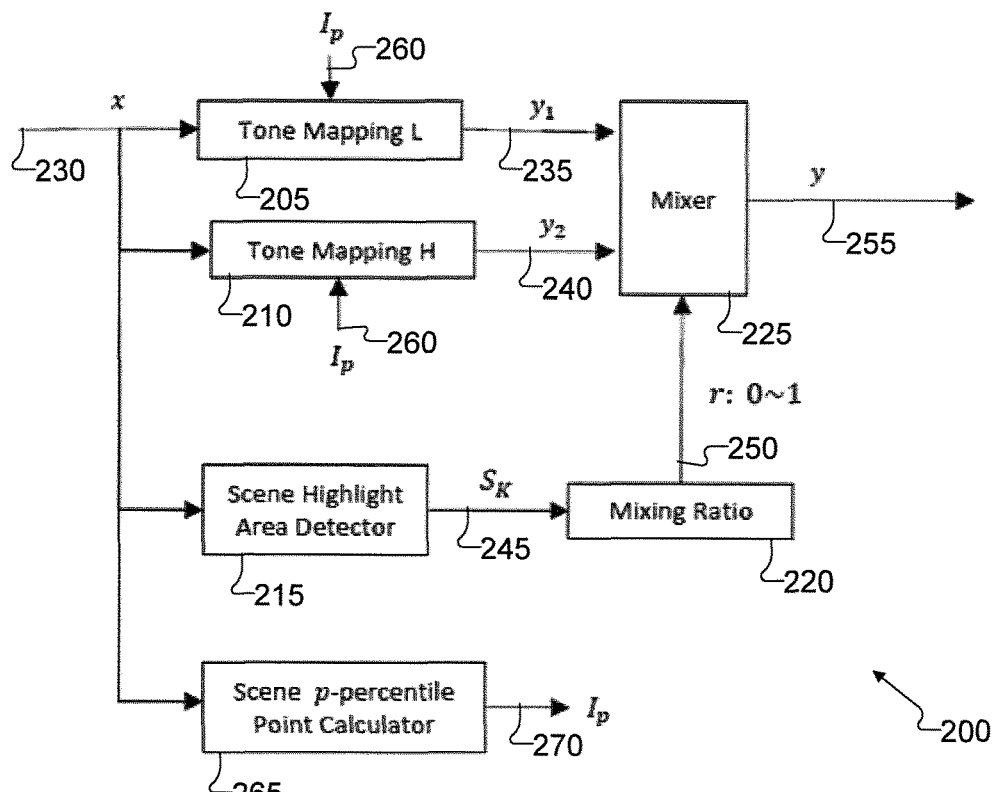
FIG. 2 illustrates an example distribution-point-based adaptive tone mapping block according to this disclosure.

FIG. 2 illustrates an example distribution-point-based adaptive tone mapping block 200 according to this disclosure. The tone mapping block 200 enables rendering images on a display device by distribution-point-based adaptive tone mapping that configures, such as by adjusting, the tone mapping function based on a p-percentile point ($I_P$). The tone mapping block 200 produces a tone mapped video $f_M^N$ from already mastered video $f_M$ with a M-nit mastering monitor, which can provide, among other characteristics, low cost because it is adaptive and automatic, and/or low or no saturation of highlighted objects or scenes.

The tone mapping block 200 applies a mix of two or more tone mappings to a video file. The tone mapping block 200 includes multiple tone mapping function blocks including a first tone mapping function block 205 and a second tone mapping function block 210, a scene highlight area detector 215, a mixing ratio block 220, and a mixer block 225, and a scene p-percentile point calculator 265. Note that the scene p-percentile point calculator 265 could be the same as or similar to corresponding scene p-percentile point calculator 140 in FIG. 1A and can operate in a same or similar manner.

In the example shown, the first and second tone mapping function blocks include a low tone mapping function block 205 and a high tone mapping function block 210. Each tone mapping function block 205 and 210 receives mastered video $f_M$ as input 230 ($x$). Additionally, each tone mapping function block 205 and 210 receives metadata 260 as input. The metadata 260 includes the p-percentile point ($I_P$) of the mastered video file 230. The metadata 260 can include a scene p-percentile point 165 ($I_P$) received from the p-percentile point calculator 140 within the mastering system 100. Alternatively, the metadata 260 can include a scene p-percentile point 270 ($I_P$) received from the p-percentile point calculator 265 within the tone mapping block 200. Each tone mapping function block 205 and 210 can configure, such as by adjusting, its tone mapping function based on the received metadata 260, as described more particularly below with reference to FIGS. 3A and 3B. Each tone mapping function block 205 and 210 generates a candidate tone mapped video as outputs 235 and 240 by applying the tone mapping function that has been configured based on the received metadata 260 to the mastered video $f_M$ of the input 230. More particularly, the low tone mapping function block 205 applies a low tone mapping function and provides an output 235, namely the candidate low-tone mapped video ($y_1$). The high tone mapping function block 210 applies a high tone mapping function and provides an output 240, namely the candidate high-tone mapped video ($y_2$). Note that the low tone mapping function block 205 provides an output 235 having more illumination range to low luminance values of the mastered video $f_M$ of the input 230 than the output 240 from the high tone mapping function block 210.

The scene highlight area detector 215 receives mastered video $f_M$ as input 230 ($x$), and generates a measure $S_K$ 245 as output. The measure $S_K$ 245 is a measure of a particular tonal-zone of a scene of the input 230 ($x$). The scene highlight area detector 215 can determine the measure $S_K$ 245 in a number of ways, which are describe below as a "Average Value," a "Ratio Value," a "Max Scene Average Value," and a "Max Scene Ratio."

According to the "Average Value" method, the scene highlight area detector 215 determines the measure $S_K$ 245 of a particular tonal-zone of a scene as the average value of the luminance values of the mastered video $f_M$ of the input 230 within the particular tonal zone (predetermined range). The particular tonal zone can be a range greater than a pre-determined constant K and less than a maximum luminance value (M) of the mastered video. The pre-determined constant K is less than a maximum luminance value (M) of the mastered video. The value of the pre-determined constant (K) can be arbitrary or can depend on characteristics of the target display device. More particularly, the scene highlight area detector 215 determines the measure $S_K$ 245 according to Equations 4 and 5 below. The term $1_{x>K}$ represents a value indicating whether the luminance value of the input (x) is greater than the pre-determined constant K; and the term x∈scene represents that x is a member of a set that is the scene.

$$S_K = \frac{\sum_{x \in scene} x \cdot 1_{x>K}}{\sum_{x \in scene} 1_{x>K}} \quad (4)$$

$$\text{where } 1_{x>K} = \begin{cases} 1, & \text{if } x > K \\ 0, & \text{else} \end{cases} \quad (5)$$

According to the "Ratio Value" method, the scene highlight area detector 215 determines the measure $S_K$ 245 as the ratio of the number of luminance values of the mastered video $f_M$ of the input 230 that within a particular tonal-zone compared to the number of luminance values of the mastered video $f_M$ of the input 230. For ease of explanation, the particular tonal zone (namely, x>K, greater than the pre-determined constant K) will be applied as an example for describing the "Ratio Value," a "Max Scene Average Value," and a "Max Scene Ratio" methods. More particularly, the scene highlight area detector 215 determines the measure $S_K$ 245 according to Equation 6 below.

$$S_K = \frac{\sum_{x \in scene} 1_{x>K}}{\sum_{scene} 1} \quad (6)$$

According to the "Max Scene Average Value" method, scene highlight area detector 215 determines the measure $S_K$ 245 as the maximum of the average values of the luminance values within a particular tonal zone of the frames in a same input scene of the mastered video $f_M$ of the input 230. In making this determination, the scene highlight area detector 215 identifies a set of frames in a same input scene, and each frame in the input scene has an index i. For example, if the input scene includes four frames, the then set is {$frame_1$, $frame_2$, ..., $frame_{i=4}$}. For each indexed frame ($frame_i$), scene highlight area detector 215 identifies and calculates an average value of the luminance values within the particular tonal zone. The scene highlight area detector 215 selects the maximum from among the average values corresponding to each indexed frame ($frame_i$). Equations 7 and 8 express the "Max Scene Average Value" method of determining the measure $S_K$ 245.

$$S_K = \max\left(\frac{\sum_{x \in frame_i} x \cdot 1_{x>K}}{\sum_{x \in frame_i} 1_{x>K}}, i = 1, 2, \ldots\right) \quad (7)$$

$$\text{where } 1_{x>K} = \begin{cases} 1, & \text{if } x > K \\ 0, & \text{else} \end{cases} \quad (8)$$

As a particular non-limiting example, if a particular indexed frame $frame_{i=3}$ includes five samples that have luminance values {1, 2, 2, 4, 5}, and if the pre-determined constant K=3, then the indexed frame includes two samples that have luminance values {4, 5} within the particular tonal-zone (x>K), and the average value corresponding to $frame_{i=3}$ is 4.5 based on (4+5)/2.

According to the "Max Scene Ratio" method, the scene highlight area detector 215 determines the measure $S_K$ 245 of a particular tonal-zone of a scene as the maximum of the ratios of the number of the frames a same input scene of the mastered video $f_M$ of the input 230 within the particular tonal zone. The scene highlight area detector 215 determines the measure $S_K$ 245 according to Equation 9 below.

$$S_K = \max\left(\frac{\sum_{x \in frame_i} 1_{x>K}}{\sum_{frame_i} 1}, i = 1, 2, \ldots\right) \quad (9)$$

The mixing ratio mock 220 receives the measure $S_K$ as input and produces the mixing ratio 250 (r) based on the measure $S_K$ 245. The mixing ratio 250 (r) represents a proportion of each of output 235 and 240 of the multiple tone mapping function blocks 205 and 210. The mixing ratio (r) can determine the amount of influence of the tone mappings. The mixing ratio 250 can be equal to zero (r=1), indicating that the tone mapped video 255 ($f_M^N$) is equal to the candidate low-tone mapped video ($y_1$) of the output 235. The mixing ratio 250 can be equal to zero (r=0), indicating that the tone mapped video 255 ($f_M^N$) is equal to the candidate low-tone mapped video ($y_1$) of the output 235. The mixing ratio 250 can be equal to one (r=1), indicating that the tone mapped video 255 ($f_M^N$) is equal to the candidate high-tone mapped video ($y_2$) of the output 240. The mixing ratio 250 can be a value between zero and one, indicating that the tone mapped video 255 ($f_M^N$) includes both: (i) some of the candidate low-tone mapped video ($y_1$) of the output 235; and (ii) some of the candidate high-tone mapped video ($y_2$) of the output 240. For example, the mixing ratio block 220 can receive each of the outputs $y_1, \ldots, y_n$ from the multiple tone mapping blocks can produce and determine a weighted combination (e.g., convex combination) of the weighted outputs (e.g., tone mapped video $y = c_1 y_1 + c_2 y_2 + \ldots + c_n y_n$ where the weights $c_1, c_2, \ldots, c_n$ sum to unity). In this way, video content having a large measure of highlight tones, for example, will cause the tone mapping block 200 to apply a mix of tone mappings that emphasizes the high tone mappings that provide more range to the highlight tones and, thereby, prevent clipping of the brighter portions of the scene. In converse, video content having a low measure of highlight tones, will cause the tone mapping block 200 to apply a mix of tone mappings emphasizes the low tone mappings provide more range to the shadows tones and, thereby, open up the details of the darker portions of the scene.

The mixer block 225 receives the mixing ratio (r) 250 and the candidate tone mapped videos $y_1$ and $y_2$ from the multiple tone mapping function blocks 605 and 610 as inputs. The mixer block 225 mixes the outputs 635 and 640 ($y_1$ and $y_2$) according to the mixing ratio 250 to generate the tone mapped video 655 ($f_M^N$) as output (y). The mixer block 225 applies Equation 10 to generate the tone mapped video 655.

$$y = (1-r)y_1 + ry_2 \quad (10)$$

Although FIG. 2 illustrates one example tone mapping block 200, various changes may be made to FIG. 2. For example, other embodiments may include more, less, or different components. For example, the mixer block 225 can be configured to generate the tone mapped video 255 by selecting one candidate tone mapped video from among the outputs of the multiple tone mapping function blocks, rather than mixing the candidate tone mapped videos. In the example shown in FIG. 2, the mixer block 225 would select one the two outputs 235 and 240 to be outputted as the tone mapped video 255 ($f_M^N$). As another example, the scene p-percentile point calculator 265 could include alternatively be a frame p-percentile point calculator (referred to by reference number 865 in FIG. 8) that calculates a frame p-percentile point 165 ($I_P$) of the mastered video file 230.

FIGS. 3A and 3B examples of tone mappings which may be utilized for tone mappings in one or more embodiments of this disclosure. The examples of tone mappings 300 and 305 shown in FIGS. 3A and 3B are for illustration only. Other embodiments could be used without departing from the scope of this disclosure.

The low and high tone mapping function blocks 205 and 210 can configure the tone mappings 300 and 305 based on the p-percentile point ($I_P$) within the metadata 260. In FIGS. 3A and 3B, the tone mappings 300 and 305 include a first tone mapping portion 345. The first tone mapping portion 345 shows that the luminance values for the input video x that are within the range of 0 to $I_P$ are mapped to luminance values for the output video ($y_1$ and $y_2$) according to a pre-determined function of the $I_P$, namely, $g(I_P)$. The pre-determined function $g(I_P)$ can be any suitable function, such as a linear function. The remainder of the tone mappings 300 and 305, outside the first tone mapping portion, shows that the luminance values for the input video x that are within the range of $I_P$ to $L_{max}$ are mapped to luminance values in the output video ($y_1$ or $y_2$) according to the corresponding low or high tone mapping function, which can be different from the pre-determined function $g(I_P)$.

In FIG. 3A, the low tone mapping 300 shows a relationship between luminance values for the input video x having a maximum luminance value of $L_{max}$ and luminance values for the output video $y_1$ that is intended for display on a target display having a maximum luminance value of N. As shown for this low tone mapping 300, certain high luminance values in the input video x are clipped or otherwise represented as the same luminance values in the output video $y_1$. Note that this clipping provides a saturation for high tones or high luminance values the input video x. For example, certain high luminance values in the input video x that are that are close to the maximum luminance value of $L_{max}$ are represented in the output video $y_1$ as having the maximum luminance value of N of the target display.

In FIG. 3B, the high tone mapping 305 shows a relationship between luminance values for the input video x having a maximum luminance value of $L_{max}$ and luminance values for the output video $y_2$ that is intended for display on a target display having a maximum luminance value of N. As depicted for this high tone mapping 305, none of the luminance values in the input video x are clipped. The luminance values in the input video x are scaled or otherwise mapped to a luminance value in the output video $y_2$. Note that this absence of clipping provides an absence of saturation for high tones or high luminance values the input video x, which results in more contrasting details or an overall darker visual depiction.

A linear mapping function 330, shown as a dashed line, scales the luminance values in the input video x that are between 0 and $L_{max}$ to luminance values in the output video ($y_1$ or $y_2$) that are in the range between 0 and N. This linear mapping function provides a basis for comparing the effects of various tone mapping functions. In a comparison of the tone mappings 300 and 305 shown in FIGS. 3A and 3B for at least some input luminance values that are between $I_P$ and $L_{max}$, the low tone mapping 300 maps the output video ($y_1$) to a luminance value that is higher above the linear mapping function than the high tone mapping 305 maps the output ($y_2$).

One or more example embodiments of this disclosure recognize that a low tone mapping may expand shadow tones by compressing highlight tones, and a high tone mapping may provide more headroom for highlight tones by compressing lower tones (e.g., mid-tones and shadow tones). By mixing, an intermediate tone mapping can be achieved dynamically. The amount of mixing of the tone mappings depends at least partly on a measure of a particular tonal zone of a scene.

Figure 4:
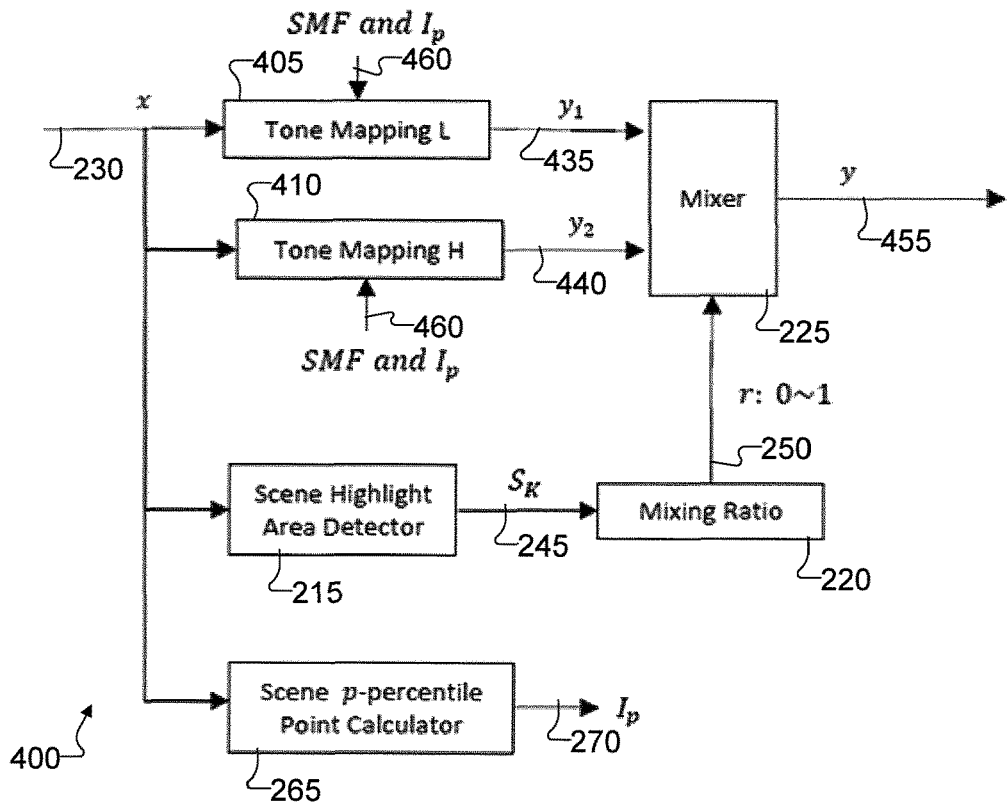
FIG. 4 illustrates an example Scene distribution-point-based adaptive tone mapping block that utilizes a metadata file according to this disclosure.

FIG. 4 illustrates an example Scene distribution-point-based adaptive tone mapping block 400 that utilizes a metadata file according to this disclosure.

Note that while multiple tone mapping blocks 200 and 400 are described herein, features of one tone mapping block could be used in the other tone mapping block. The tone mapping block 400 could include the components of the tone mapping block 200 shown in FIG. 2 and could operation in a same or similar manner. For instance, the tone mapping block 400 could receive the mastered video $f_M$ as input 230 ($x$) and could include the scene highlight area detector 215 that outputs the measure $S_K$ 245, the mixing ratio block 220 that outputs the mixing ratio 250, the scene p-percentile point calculator 265 that outputs the scene p-percentile point 270 ($I_P$), and the mixer 225 of the tone mapping block 200. For simplicity of explanation, descriptions of the features 215, 220, 225, 230, 245, 265, and 270 will not be duplicated with reference to FIG. 4.

The tone mapping block 400 applies a mix of two or more tone mappings to a video file, as described in reference to FIG. 2. The tone mapping block 400 includes multiple tone mapping function blocks including a first tone mapping function block 405 and a second tone mapping function block 410. The first and second tone mapping function blocks include a low tone mapping function block 405 and a high tone mapping function block 410. Each tone mapping function block 405 and 410 receives mastered video $f_M$ as input 230 ($x$). Additionally, each tone mapping function block 405 and 410 receives metadata 460 (SMF) as input. The metadata 460 includes the p-percentile point ($I_P$) of the mastered video file 230. The metadata 460 additionally includes an extracted metadata, such as: the M value, the MaxCLL value, or the MaxFALL value output from the metadata extraction module 130 of a mastering process. Each tone mapping function block 405 and 410 can further configure, such as by adjusting, its tone mapping function based on the received SMF within the metadata 460, as described more particularly below with reference to FIGS. 5A, 5B, 5C, 5D, 5E, and 5F. Each tone mapping function block 405 and 410 generates a candidate tone mapped video as outputs 435 and 440 by applying the tone mapping function that has been configured based on the $I_P$ and the received SMF within the metadata 460 to the mastered video $f_M$ of the input 230.

The mixer block 225 receives the mixing ratio (r) 250 and the candidate tone mapped videos $y_1$ and $y_2$ from the multiple tone mapping function blocks 405 and 410 as inputs. The mixer block 225 mixes the outputs 435 and 440 ($y_1$ and $y_2$) according to the mixing ratio 250 to generate the tone mapped video 455 ($f_M^N$) as output (y). The mixer block 225 applies Equation 10 to generate the tone mapped video 455.

$$y=(1-r)y_1+ry_2 \qquad (10)$$

Although FIG. 4 illustrates one example tone mapping block 400, various changes may be made to FIG. 4. For example, the mixer block 225 can be configured to generate the tone mapped video 455 by selecting one candidate tone mapped video from among the outputs of the multiple tone mapping function blocks, rather than mixing the candidate tone mapped videos. In the example shown in FIG. 2, the mixer block 225 would select one the two outputs 435 and 440 to be outputted as the tone mapped video 455 ($f_M^N$).

FIGS. 5A, 5B, 5C, 5D, 5E, and 5F illustrate examples of tone mappings configured based on metadata and a distribution-point ("p-percentile point") which may be utilized for tone mappings in one or more embodiments of this disclosure. FIGS. 5A, 5B, 5C, 5D, 5E, and 5F show examples of tone mappings 500, 505, 510, 515, 520, and 525 configured based on the $I_P$ together with another metadata, such as a received SMF metadata (e.g., M, MaxCLL, MaxFALL). The examples of tone mappings 500, 505, 510, 515, 520, and 525 shown in FIGS. 5A, 5B, 5C, 5D, 5E, and 5F are for illustration only. Other embodiments could be used without departing from the scope of this disclosure.

In each of FIGS. 5A, 5C, and 5E the low tone mapping shows a relationship between luminance values for the input video x having a maximum luminance value of $L_{max}$ and luminance values for the output video $y_1$ that is intended for display on a target display having a maximum luminance value of N. In each of FIGS. 5B, 5D, and 5F, the high tone mapping shows a relationship between luminance values for the input video x having a maximum luminance value of $L_{max}$ and luminance values for the output video $y_2$ that is intended for display on a target display having a maximum luminance value of N.

In FIGS. 5A, 5B, 5C, 5D, 5E, and 5F, the tone mappings 500, 505, 510, 515, 520, and 525 include a first tone mapping portion 545. The first tone mapping portion 545 shows that the luminance values for the input video x that are within the range of 0 to $I_P$ are mapped to luminance values for the output video ($y_1$ and $y_2$) according to a pre-determined function of the $I_P$, namely, $g(I_P)$. The pre-determined function $g(I_P)$ can be any suitable function, such as a linear function.

In FIGS. 5A, 5B, 5C, 5D, 5E, and 5F, the remainder of the tone mappings 500, 505, 510, 515, 520, and 525, outside the first tone mapping portion, shows that the luminance values for the input video x that are within the range of $I_P$ to the luminance value of the other corresponding metadata (e.g., M, MaxCLL, and $M_C$) are mapped to luminance values in the output video ($y_1$ or $y_2$) according to the other corresponding metadata (e.g., M, MaxCLL, and $M_C$) that serves as the basis for the configuration of the tone mapping. For example, FIGS. 5A and 5B show that the remainder of tone mappings 500 and 505 is configured based on the M metadata. FIGS. 5C and 5D show that the remainder of tone mappings 510 and 515 is configured based on the MaxCLL metadata. FIGS. 5E and 5F show that the remainder of tone mappings 520 and 525 is configured based on the $M_C$ metadata, namely a combination of metadata such as, a minimum value selected from the maximum contents luminance level (MaxCLL) and the maximum luminance level of the mastering monitor (M). The low and high tone mapping function blocks 405 and 410 can configure the tone mappings not only based on the $I_P$, but also based on various received SMF within the metadata, and each SMF metadata affects the low and high tone mappings differently.

FIGS. 5A, 5B, 5C, 5D, 5E, and 5F further include linear mapping functions 530, 535, and 540 that provide a basis for comparing the effects of various tone mapping functions in a similar manner as the linear mapping function 330 in FIG. 3. The linear mapping functions 530, 535, and 540 scale the luminance values in the input video x that are between 0 and the other corresponding metadata (e.g., M, MaxCLL, and $M_C$) to luminance values in the output video ($y_1$ or $y_2$) that are in the range between 0 and N.

Figure 6:
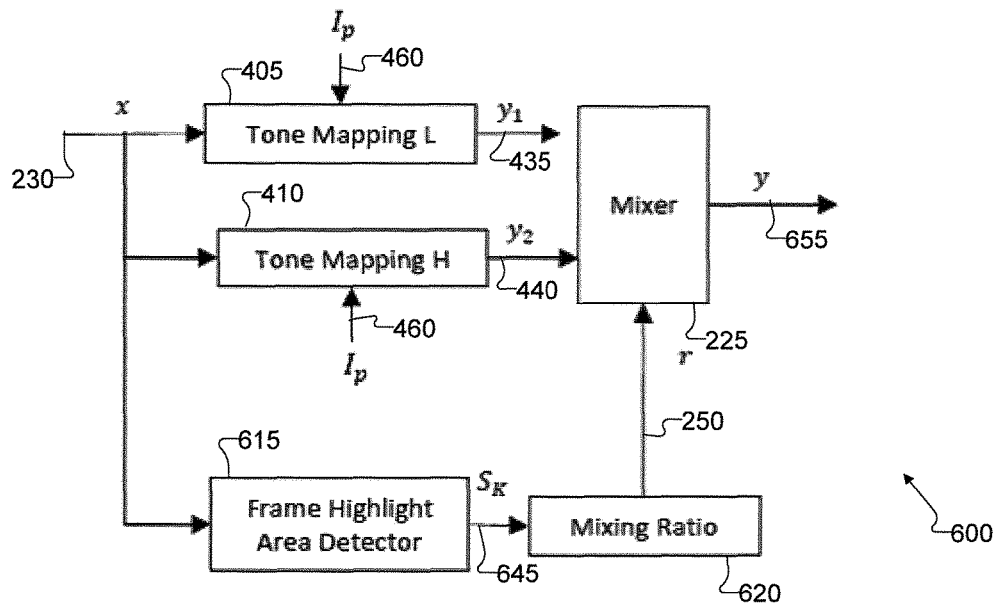
FIG. 6 illustrates an example adaptive tone mapping block that utilizes a saved p-percentile point according to this disclosure.

FIG. 6 illustrates an example adaptive tone mapping block 600 that utilizes a saved p-percentile point according to this disclosure. As an example, the mastering process 101 of FIG. 1B provides inputs to the tone mapping block 600 that utilizes a saved p-percentile point.

Note that while multiple tone mapping blocks 400 and 600 are described herein, features of one tone mapping block could be used in the other tone mapping block. The tone mapping block 600 could include the features of the tone mapping block 400 shown in FIG. 4 and could operation in a same or similar manner.

By way of comparison between the tone mapping blocks 600 and 400, the tone mapping block 600 does not include a scene p-percentile point calculator 265. Accordingly, in the tone mapping block 600, the metadata 260 includes a scene p-percentile point 165 ($I_P$) received from the p-percentile point calculator 140 within a mastering process, such as the mastering process 101.

Also by way of comparison between the tone mapping blocks 600 and 400, the tone mapping block 600 includes a frame highlight area detector 615 that receives mastered video 120 $f_M$ as input, generates a measure $R_K$ 645 of a particular tonal zone of a frame, and outputs the measure $R_K$ 645 to the mixing ratio block 620. Accordingly, the mixing ratio block 620 receives the measure $R_K$ 645 of a frame as input and produces the mixing ratio 250 ($r$) based on the measure $R_K$ 645 of a frame. The frame highlight area detector 615 can operate in a same or similar manner as the tonal-zone area detector 135 of FIGS. 1A and 1B described above. The mixing ratio block 620 can operate in a same or similar manner as the mixing ratio block 220 of FIG. 2 described above. The mixer block 225 can generate the output 655 by operating in a similar manner as the mixer block 225 of FIG. 2.

Although FIG. 6 illustrates one example adaptive tone mapping block 600 that utilizes a saved p-percentile point, various changes may be made to FIG. 6. For example, the frame highlight area detector 615 could be substituted for a scene highlight area detector 215 that generates and outputs measure $S_K$ 245. Also, the mixing ratio block 620 could be substituted for a mixing ratio block 220 that produces the mixing ratio 250 ($r$) based on the measure $S_K$ 245 of a scene. As another example, tonal-zone highlight information, namely, scene highlight area information $S_K$ 245 or frame highlight area information $R_K$ 645 could be read in as a file linked to the mastered video $f_M$ of the input 230 or otherwise received from the mastering process 101, instead the mixing ratio block receiving this information from another component 215 or 615 within the tone mapping block 600.

Figure 7:
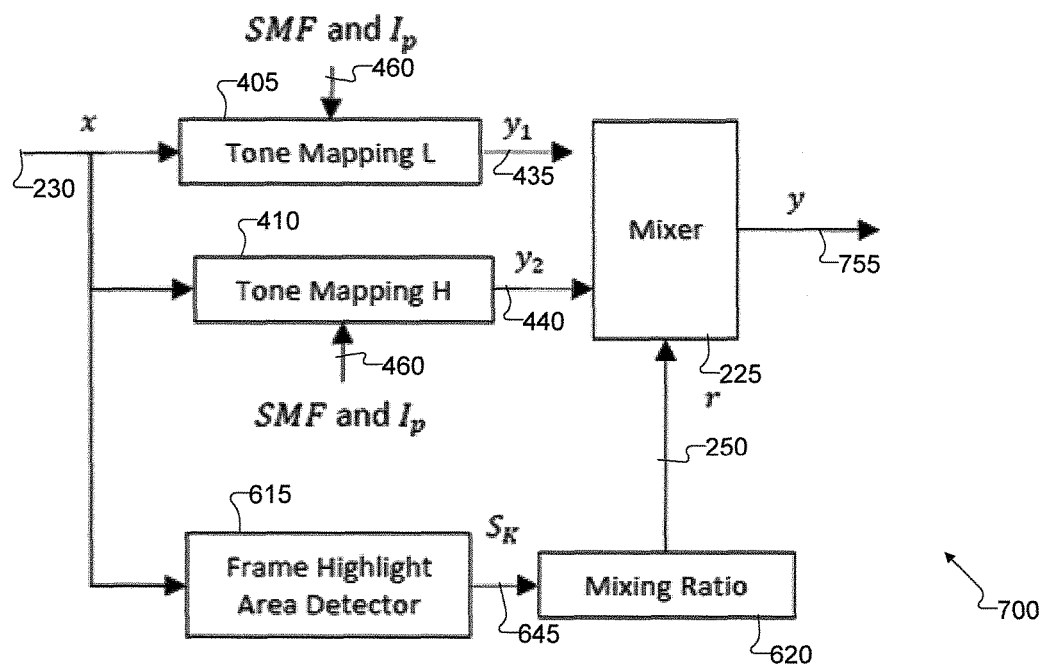
FIG. 7 illustrates an example adaptive tone mapping block that utilizes a saved p-percentile point and metadata according to this disclosure.

FIG. 7 illustrates an example adaptive tone mapping block 700 that utilizes a saved p-percentile point ($I_P$) and metadata (SMF) according to this disclosure. As an example, the mastering system 100 of FIG. 1A provides inputs to the tone mapping block 700 that utilizes a saved p-percentile point and metadata (SMF).

Note that while multiple tone mapping blocks 400 and 700 are described herein, features of one tone mapping block could be used in the other tone mapping block. The tone mapping block 700 could include the features 225, 230, 250 405, 410, 435, 440, and 460 of the tone mapping block 400 shown in FIG. 4 and could operation in a same or similar manner. Similarly, the tone mapping block 700 could include the features 615, 620, and 645 of the tone mapping block 600 shown in FIG. 6 and could operation in a same or similar manner.

By way of comparison between the tone mapping blocks 700 and 400, the tone mapping block 700 does not include a scene p-percentile point calculator 265. Accordingly, in the tone mapping block 700, the metadata 260 includes a scene p-percentile point 165 ($I_P$) received from the p-percentile point calculator 140 within a mastering process, such as the mastering process 101.

The mixer block 225 can generate the output 755 by operating in a similar manner as the mixer block 225 of FIG. 2.

Although FIG. 7 illustrates one example adaptive tone mapping block 700 that utilizes a saved p-percentile point ($I_P$) and saved metadata (SMF), various changes may be made to FIG. 7. For example, other embodiments may include more, less, or different components.

FIG. 8 illustrates an example a video display 800 that implements p-percentile point adaptive tone mapping according to this disclosure. The video display 800 could receive input namely, a quantized mastered video file 135 ($Q_n(f_M)$), from the mastering system 100 of FIG. 1A. The embodiment of the video display 800 shown in FIG. 8 is for illustration only. Other embodiments could be used without departing from the scope of the present disclosure.

The video display 800 includes a dequantizer module 805 ($Q_n^{-1}$), the tone mapping block 200 of FIG. 2, and an m-bit display 820. In certain embodiments, the video display 800 additionally includes a nit-to-bit (NTB) converter module 815 intermediately coupled between, such as operably connected to both, the tone mapping block 200 and the m-bit display 820. Although the metadata extraction module 130 of the mastering system 100 outputs the SMF metadata 145, the tone mapping block 200 of the video display 800 receives no SMF metadata 145. For simplicity of explanation, descriptions of features common between FIG. 8 and previous figures will not be duplicated with reference to FIG. 8.

The dequantizer module 805 that can generate a mastered video file 825 ($x$) by applying a dequantization function to the quantized mastered video file 145. The mastered video file 825 ($x$) can be the same as or similar to the mastered video $f_M$ of input 230 ($x$) of FIG. 2.

The NTB 815 receives the tone mapped video 830 ($y$) from the tone mapping block 200 in a nits format. That is, the tone mapped video 830 ($y$) can be the same as or similar to the tone mapped video 255 ($f_M^N$) of FIG. 2. The NTB 815 converts the tone mapped video 830 to an m-bit format 835 by applying a nit-to-bit conversion function to the video data of the tone mapped video 830.

The m-bit display 820 has a maximum luminance level of N nits (shown as Max N-nit). For example, the m-bit display 820 represents a target display that has a different maximum luminance level compared to the M value, namely the maximum luminance level of the mastering monitor 140.

Although FIG. 8 illustrates one example video display system 800, various changes may be made to FIG. 8. For example, in other embodiments such as shown in FIG. 9, the video display 900 could include the tone mapping block 400, which can receive the SMF metadata 145 from the mastering system 100 as input (e.g., metadata 460), and thus, the video display 900 could configure its tone mapping functions based on both the received SMF metadata 145 and the $I_P$.

Figure 9:
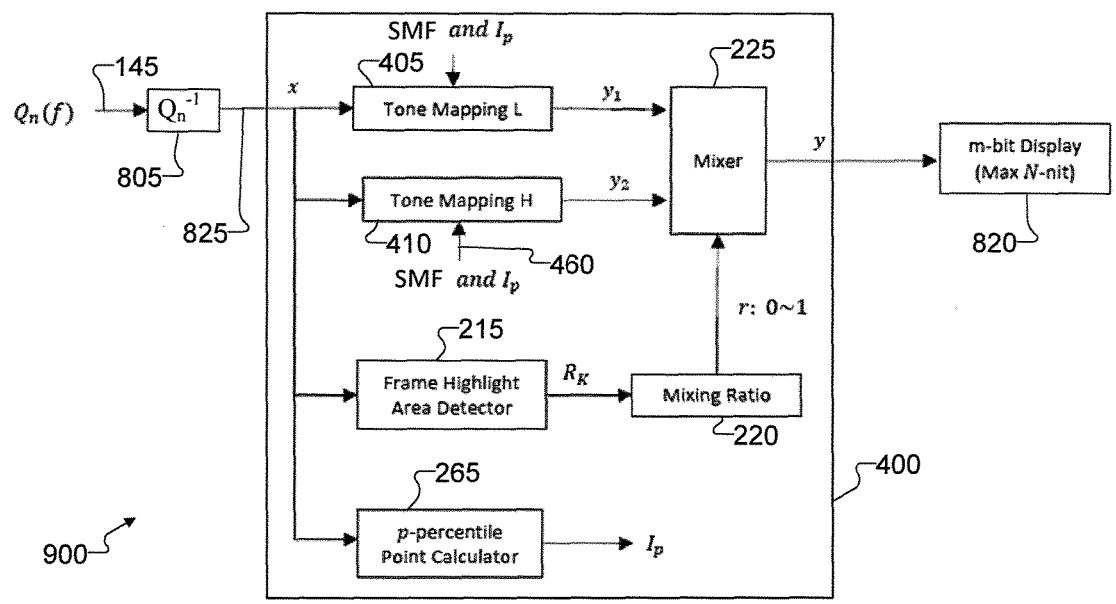
FIG. 9 illustrates an example a video display that implements p-percentile point adaptive tone mapping and utilizes metadata according to this disclosure.

FIG. 9 illustrates an example a video display 900 that implements p-percentile point adaptive tone mapping and utilizes metadata according to this disclosure. The embodiment of the video display 900 shown in FIG. 9 is for illustration only. Other embodiments could be used without departing from the scope of the present disclosure.

The video display 900 includes the dequantizer module 805 ($Q_n^{-1}$), the tone mapping block 400 of FIG. 4, and an m-bit display 820. In certain embodiments, the video display 900 additionally includes a nit-to-bit (NTB) converter module 815 intermediately coupled between, such as operably connected to both, the tone mapping block 400 and the m-bit display 820. For simplicity of explanation, descriptions of features common between FIG. 9 and previous figures will not be duplicated with reference to FIG. 9.

Figure 10:
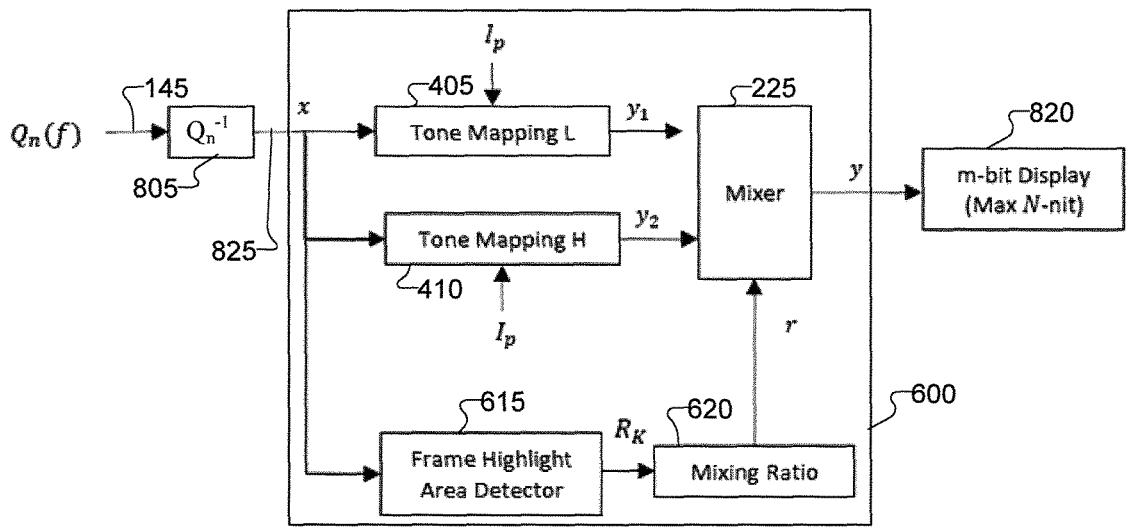
FIG. 10 illustrates an example a video display that implements adaptive tone mapping and utilizes Scene p-percentile point as metadata according to this disclosure.

FIG. 10 illustrates an example a video display 1000 that implements adaptive tone mapping and utilizes Scene p-percentile point as metadata according to this disclosure. The embodiment of the video display 1000 shown in FIG. 10 is for illustration only. Other embodiments could be used without departing from the scope of the present disclosure.

The video display 1000 includes the dequantizer module 805 ($Q_n^{-1}$), the tone mapping block 600 of FIG. 6, and an m-bit display 820. In certain embodiments, the video display 1000 additionally includes a nit-to-bit (NTB) converter module 815 intermediately coupled between, such as operably connected to both, the tone mapping block 600 and the m-bit display 820. For simplicity of explanation, descriptions of features common between FIG. 10 and previous figures will not be duplicated with reference to FIG. 10.

Figure 11:
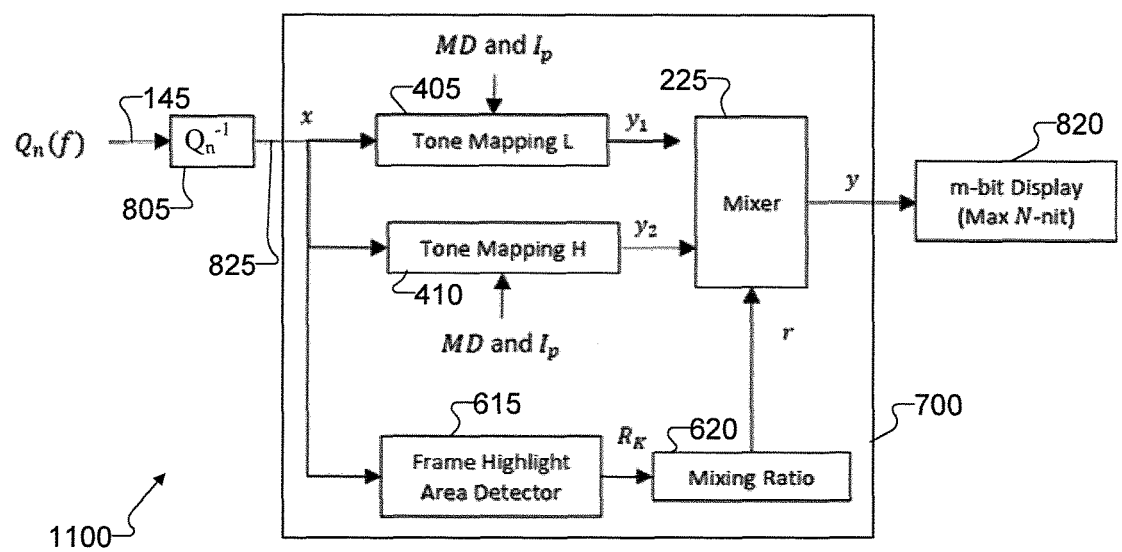
FIG. 11 illustrates an example a video display that implements adaptive tone mapping and utilizes a saved p-percentile point and metadata according to this disclosure.

FIG. 11 illustrates an example a video display 1100 that implements adaptive tone mapping and utilizes a saved p-percentile point and metadata according to this disclosure. The embodiment of the video display 1100 shown in FIG. 11 is for illustration only. Other embodiments could be used without departing from the scope of the present disclosure.

The video display 1100 includes the dequantizer module 805 ($Q_n^{-1}$), the tone mapping block 700 of FIG. 7, and an m-bit display 820. In certain embodiments, the video display 1100 additionally includes a nit-to-bit (NTB) converter module 815 intermediately coupled between, such as operably connected to both, the tone mapping block 700 and the m-bit display 820. For simplicity of explanation, descriptions of features common between FIG. 11 and previous figures will not be duplicated with reference to FIG. 11.

Figure 12:
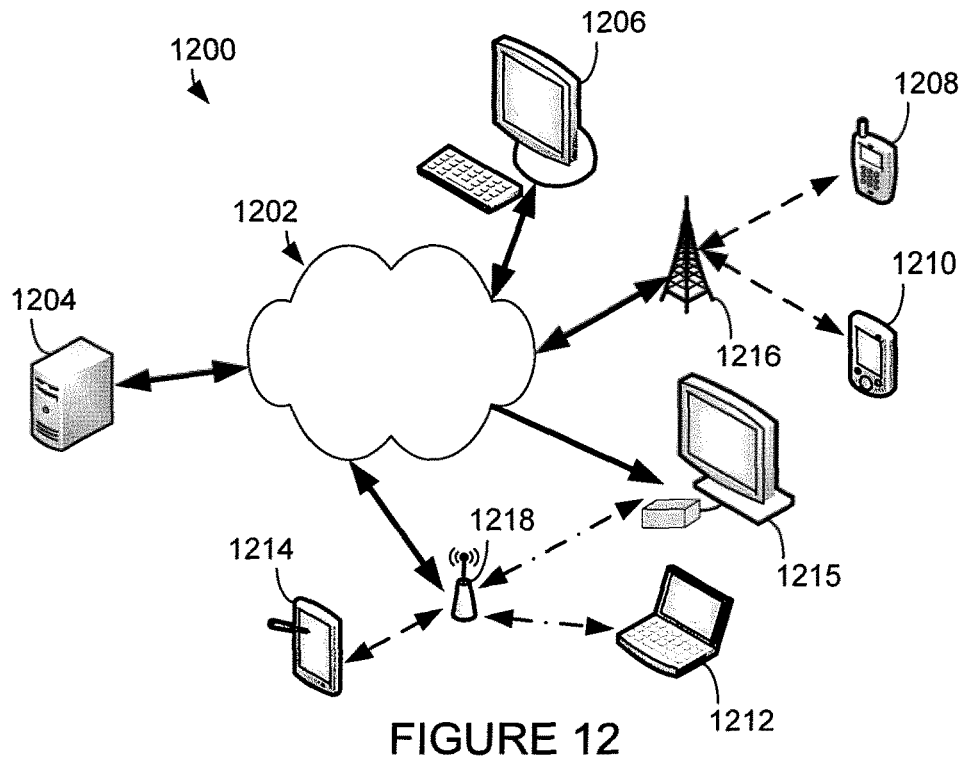
FIG. 12 illustrates an example computing system in which various embodiments of this disclosure may be implemented.

FIG. 12 illustrates an example computing system 1200 in which various embodiments of this disclosure may be implemented. The embodiment of the computing system 1200 shown in FIG. 12 is for illustration only. Other embodiments of the computing system 1200 could be used without departing from the scope of this disclosure.

As shown in FIG. 12, the system 1200 includes a network 1202, which facilitates communication between various components in the system 100 on one or more communication channels. The network 1202 may communicate Internet Protocol (IP) packets, frame relay frames, or other information between network addresses. The network 1202 may include one or more local area networks (LANs): metropolitan area networks (MANs); wide area networks (WANs); all or a portion of a global network, such as the Internet; or any other communication system or systems at one or more locations.

In various embodiments, network 1202 includes a broadcast and broadband networks and communication channels for communicating video data (e.g., video files including metadata and audio content) to client devices 1206-1215. The broadcasting elements of network 1202, such as cable and satellite communication links, provide broadcast of video data to client devices 106-115. The broadband elements of network 1202, Internet, wireless, wireline, and fiber optic network links and devices, provide for streaming and download of video data.

The network 1202 facilitates communications between one or more servers 1204 and various client devices 1206-1215. Each of the servers 1204 includes any suitable computing or processing device that can provide computing services for one or more client devices. Each of the servers 1204 could, for example, include one or more processing devices, one or more memories storing instructions and data, and one or more network interfaces facilitating communication over the network 1202. For example, one or more of the servers 104 may include processing circuitry for mastering a video or for distribution-point-based adaptive tone mapping, as discussed in greater detail below.

Each client device 1206-1215 represents any suitable computing or processing device that interacts with at least one server or other computing device(s) over the network 1202. As will be discussed in greater detail below, the client devices 1206-1215 receive video (e.g., a mastered video file to be tone mapped or a tone mapped video file to be displayed) and may include processing circuitry for distribution-point-based adaptive tone mapping. The client devices 1206-1215 each either includes or is connected to a display device for display of tone mapped video. In this example, the client devices 1206-1215 include a computer 1206, a mobile telephone or smartphone 1208, a personal digital assistant (PDA) 1210, a laptop computer 1212, tablet computer 1214; and a set-top box and/or television 1215. However, any other or additional client devices could be used in the communication system 1200. In this example, some client devices 1208-1514 communicate indirectly with the network 1202. For example, the client devices 1208-1510 communicate via one or more base stations 1216, such as cellular base stations or eNodeBs. Also, the client devices 1212-1215 communicate via one or more wireless access points 1218, such as IEEE 802.11 wireless access points. Note that these are for illustration only and that each client device could communicate directly with the network 102 or indirectly with the network 1202 via any suitable intermediate device(s) or network(s).

Although FIG. 12 illustrates one example of a communication system 1200, various changes may be made to FIG. 12. For example, the system 1200 could include any number of each component in any suitable arrangement. In general, computing and communication systems come in a wide variety of configurations, and FIG. 12 does not limit the scope of this disclosure to any particular configuration. While FIG. 12 illustrates one operational environment in which various features disclosed in this patent document can be used, these features could be used in any other suitable system. For example, video can be provided to user devices (e.g., client device 1206-1215) without using the network 1202 via computer readable medium (e.g., BLU-RAY discs).

Figure 13:
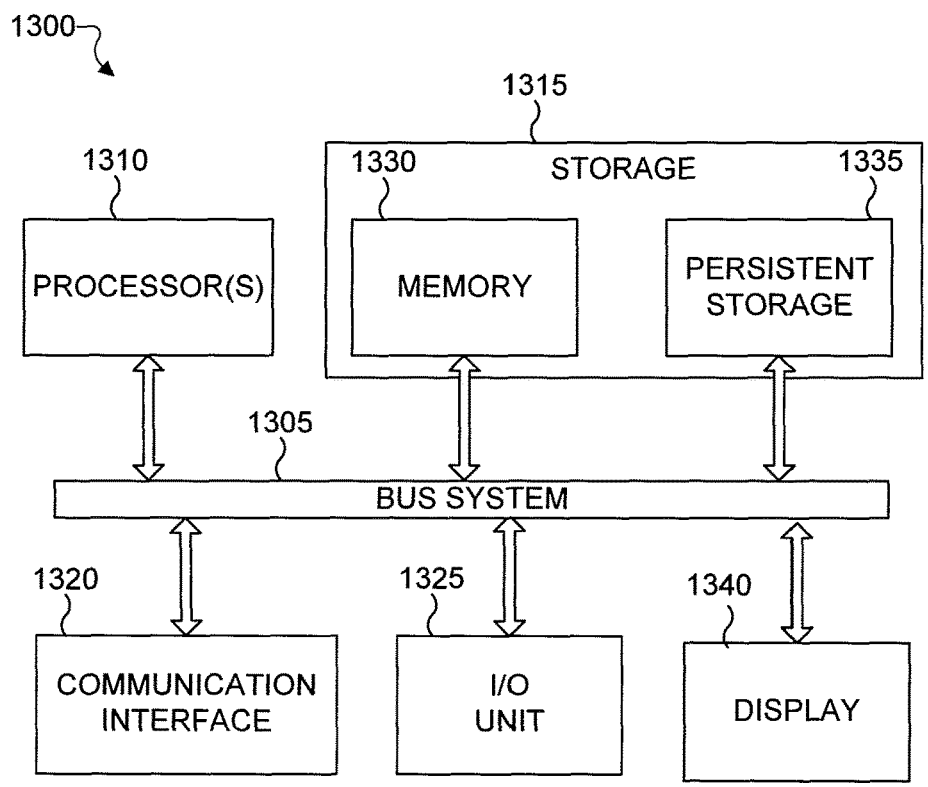
FIG. 13 illustrates an example video processing device according to this disclosure.

FIG. 13 illustrates an example video processing device 1300 according to this disclosure. In particular, the video processing device 1300 illustrates example components that may be included in any one of the server 1204 or the client devices 1206-115 in FIG. 12 to implement one or more embodiments of the present disclosure.

As shown in FIG. 13, the video processing device 1300 includes a bus system 1305, which supports communication between at least one processor 1310, at least one storage device 1315, at least one communication interface 1320, at least one input/output (I/O) unit 1325, and a display 1340.

The processor 1310 executes instructions that may be loaded into a memory 1330. The processor 1310 may include any suitable number(s) and type(s) of processors or other devices in any suitable arrangement. Example types of processor 1310 include microprocessors, microcontrollers, digital signal processors, field programmable gate arrays, application specific integrated circuits, and discreet circuitry. For example, the processor 1310 may implement tone mapping operations performed by any of the systems 300-800 being implemented in hardware or by executing stored instructions that causes the processor 1310 to perform the disclosed methods.

The memory 1330 and a persistent storage 1335 are examples of storage devices 1315, which represent any structure(s) capable of storing and facilitating retrieval of information (such as video data, program code, and/or other suitable information on a temporary or permanent basis). The memory 1330 may represent a random access memory or any other suitable volatile or non-volatile storage device(s). For example, the memory 1330 may contain instructions for implementing tone mapping techniques and/or may store streamed or buffered video data received from a server 1204. The persistent storage 1335 may contain one or more components or devices supporting longer-term storage of data, such as a read-only memory, hard drive, Flash memory, or optical disc. For example, the persistent storage 1335 may contain video data such as a mastered video file and metadata associated with the mastered video file.

The communication interface 1320 supports communications with other systems or devices. For example, the communication interface 1320 could include a network interface card, a cable modem, a broadcast receiver, or a wireless transceiver facilitating communications over the network 1202. The communication interface 1320 may support communications through any suitable physical or wireless communication link(s).

The I/O unit 1325 allows for input and output of data. For example, the I/O unit 1325 may provide a connection for user input through a keyboard, mouse, keypad, touchscreen, or other suitable input device. The I/O unit 1325 may also send output to the display 1340, printer, or other suitable output device.

The video processing device 1300 further includes or is connected to a display 1340, such as, for example, the target displays 705 and 805. In one example embodiment, the video processing device 1300 may be video processing circuitry included in a set top box, cable box, computer, etc. connected to the display 1340 for tone mapped video to be displayed. In another example embodiment, the video processing device 1300 may be the set top box, cable box, computer, media player, etc. connected to the display 1340 for tone mapped video to be displayed. In yet another example embodiment, the video processing device 1300 may be a server connected to the target display 1340 over a network connection. In another example embodiment, the video processing device 1300 may include the display 1340 that the tone mapped video to be displayed on as well as the video processing circuitry for performing the tone mapping. For example, the video processing device 1300 may be a television, monitor, mobile phone, laptop computer, tablet computer, etc.

Figure 14:
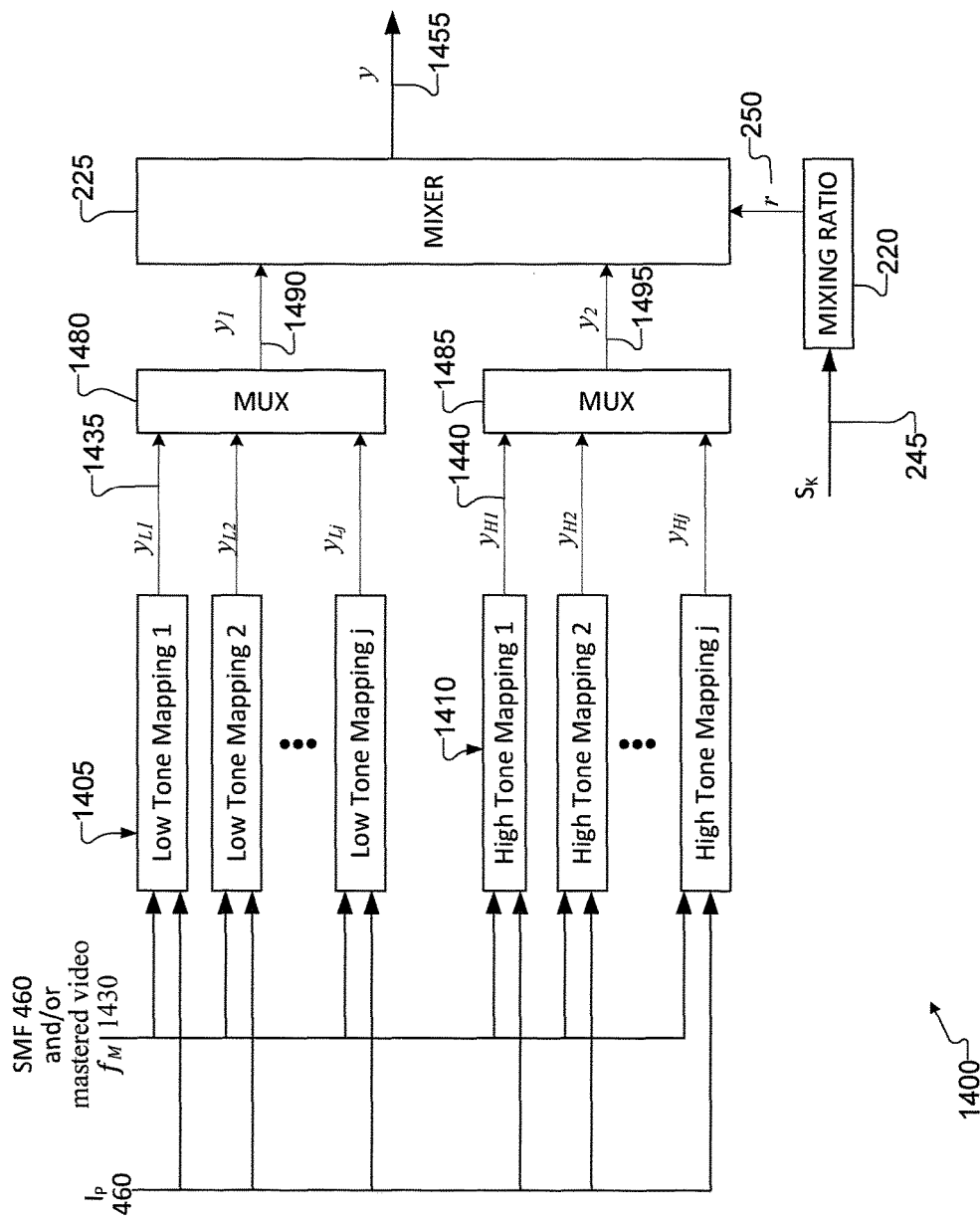
FIG. 14 illustrates an example adaptive tone mapping block that selects a candidate tone mapping function based on a p-percentile point according to this disclosure.

FIG. 14 illustrates an example adaptive tone mapping block that selects a candidate tone mapping function based on a p-percentile point according to this disclosure. The tone mapping block 1400 generates a tone mapped vide file by applying a selection of one or more tone mappings to a video file.

The tone mapping block 1400 includes certain features 220, 235, 245, and 250 from the tone mapping block of FIG. 2. The tone mapping block 1400 includes multiple tone mapping function blocks including a first tone mapping function block 1405 and a second tone mapping function block 1410. The first and second tone mapping function blocks include a low tone mapping function block 1405 and a high tone mapping function block 1410. The multiple tone mapping function blocks could include a number j of low tone mapping function blocks 1405 (Low Tone Mapping 1, Low Tone Mapping 2, . . . Low Tone Mapping j). The multiple tone mapping function blocks could include a number j of high tone mapping function blocks 1410 (High Tone Mapping 1, High Tone Mapping 2, . . . High Tone Mapping j).

Each tone mapping function block 1405 and 1410 receives input 1430 ($x$) that includes the mastered video $f_M$. Additionally, each tone mapping function block 1405 and 1410 receives metadata 1460 (SMF) as input. The metadata 1460 includes the p-percentile point ($I_P$) of the mastered video file 1430. The metadata 1460 additionally includes an extracted metadata, such as: the M value, the MaxCLL value, or the MaxFALL value output from the metadata extraction module 130 of a mastering process. Each tone mapping function block 1405 and 1410 can configure, such as by adjusting, its tone mapping function based not only on the $I_P$, but additionally based on the received SMF within the metadata 1460. Each tone mapping function block 1405 and 1410 generates a candidate tone mapped video as outputs 1435 and 1440 by applying the tone mapping function that has been configured based on the $I_P$ and the received SMF within the metadata 1460 to the mastered video $f_M$ of the input 1430. More particularly, the Low Tone Mapping blocks 1405 with an index 1, 2, . . . j generate the outputs 1435 include indexed candidate tone mapped videos $y_{L1}$, $y_{L2}$, . . . $y_{Lj}$. The High Tone Mapping blocks 1410 with an index 1, 2, . . . j generate the outputs 1440 include indexed candidate tone mapped videos $y_{H1}$, $y_{H2}$, . . . $y_{Hj}$.

The first and second multiplexers 1480 and 1485 (together referred to as a selector) receive the outputs 1435 and 1440 from the multiple tone mapping blocks 1405 and 1410. The selector receives metadata 1460 (SMF) as input, including the p-percentile point ($I_P$) of the mastered video file 1430. The selector selects one or more candidate tone mapped videos to output. For example, the first multiplexer 1480 outputs one from among the indexed candidate tone mapped videos $y_{L1}$, $y_{L2}$, . . . $y_{Lj}$ as the output 1490 ($y_1$); and the second multiplexer 1485 outputs one from among the indexed candidate tone mapped videos $y_{H1}$, $y_{H2}$, . . . $y_{Hj}$ as the output 1495 ($y_1$); and the mixer 235 of FIG. 2 generates the tone mapped video 1455 ($f_M^N$) by mixing the outputs 1490 and 1495 using Equation 1. In certain embodiments, the selector generates the tone mapped video 1455 ($f_M^N$) by bypassing the mixer and by selecting one from among the outputs 1490 and 1495 to be the tone mapped video 1455.

Although FIG. 14 illustrates one example tone mapping block 1400, various changes may be made to FIG. 14. For example, other embodiments may include more, less, or different components. As another example, a single tone mapping function (also referred to as a tone curve) is can be used. Instead of mixing multiple tone mapping functions to achieve content adaptive tone mapping, the tone mapping block 1400 adjusts the single tone mapping function based on the p-percentile point determined from metadata or by processing the video. For example, the single tone mapping function can be parameterized by the p-percentile point. The parameterization can manifest in scaling and shifting portions of the tone curve. In one particular embodiment, the p-percentile point can be used to adjust one or more parameters of a Bezier curve.

While a number of illustrative examples are described above in the context of having multiple tone mapping functions (e.g., the tone mapping function blocks 205, 210 of FIG. 2), it will be understood that alternative embodiments can include a single tone mapping function block. For example, in connection with FIG. 2, blocks 210, 215, 220, 225 can be omitted, and the output of the tone mapping function block 205 can serve as the tone mapped video. Furthermore, the tone mapping function block 260, in either the single or multiple tone mapping function embodiments, can be implemented as a parameterized relationship (e.g., mathematical equation or lookup table) that depends on the p-percentile point as a parameter. In an example embodiment, the tone mapping function block can correspond to a normalized parameterized Bezier function wherein one at least one parameter depends at least partly on the p-percentile point.

Figure 15:
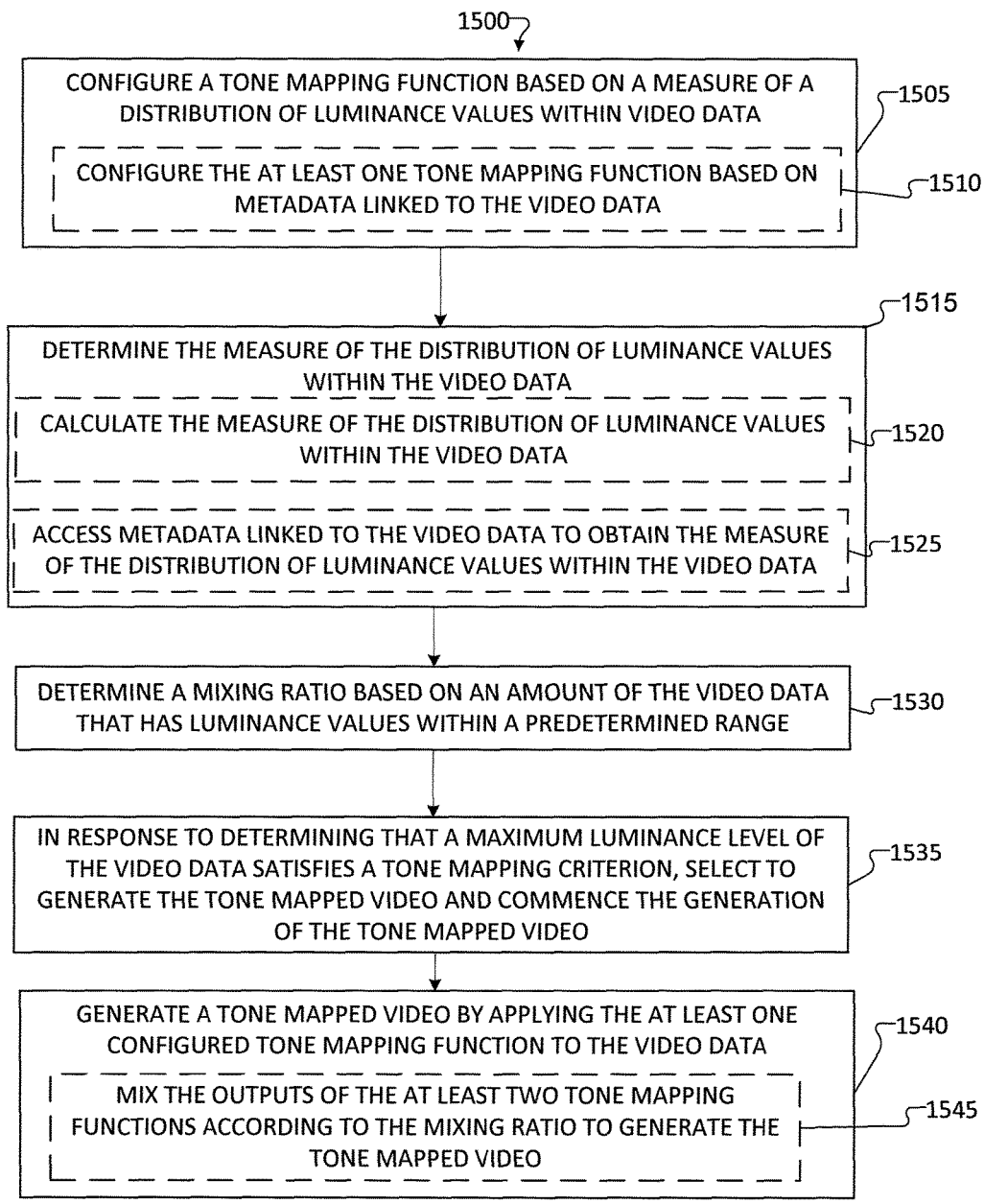
FIG. 15 illustrates method for tone mapping according to this disclosure.

FIG. 15 illustrates method 1500 for tone mapping according to this disclosure. The method for tone mapping can be implemented by a tone mapping block, such as one or more of the tone mapping blocks 200, 400, 600, 700, 1400 each of which includes at least one processor (referred to as "the processor" in regarding FIG. 15).

In block 1505, the processor configures a tone mapping function based on a measure of a distribution of luminance values within video data. For example, as shown in FIG. 2, each of the tone mapping function blocks 205 and 210 configures its tone mapping function based on the p-percentile point ($I_P$) received as the metadata 260. In certain embodiments, in order to configure the at least one tone mapping function, the processor configures the at least one tone mapping function based on metadata linked to the video data, as shown in block 1510. For example, the metadata 260 can include a scene p-percentile point 165 ($I_P$) received from the p-percentile point calculator 140 within the mastering system 100.

In block 1515, the processor determines the measure ($I_P$) of the distribution of luminance values within the video data. In certain embodiments, in order to make this determination, the processor calculates the measure of the distribution of luminance values within the video data, as shown in block 1520. For example, the processor can include a p percentile point calculator, such as the scene p-percentile point 270 of FIG. 2. In certain embodiments, in order to make this determination, the processor accesses metadata linked to the video data to obtain the measure of the distribution of luminance values within the video data, as shown in block 1525. For example, the processor can receive metadata 460 that includes the p-percentile point ($I_P$), as shown in FIG. 4.

In certain embodiments the method 1500, the at least one configured tone mapping function that is applied to the video data includes at least two tone mapping functions. In such embodiments, the method 1500 can further include block 1530, wherein the processor determines a mixing ratio based on an amount of the video data that has luminance values within a predetermined range. For example, the tone mapping block can include a mixing ratio block 220, as shown in FIG. 2.

In block 1535, in response to determining that a maximum luminance level of the video data satisfies a tone mapping criterion, the processor selects to generate a tone mapped video and commences the generation of the tone mapped video. For example, embodiments of the present disclosure are not limited to always generating a tone mapped video upon ever receipt of a mastered video file, such as the mastered video file 230, but can select to generate a tone mapped video based on a tone mapping criterion. An example of satisfying a tone mapping criterion is when input video x has a maximum luminance value of $L_{max}$ that exceeds the maximum luminance value of N a target display.

In block 1540, the processor generates a tone mapped video by applying the at least one configured tone mapping function to the video data. For example, the processor can generate the tone mapped video 1455 ($f_M^N$) by bypassing the mixer and by selecting one from among the outputs 1490 and 1495 to be the tone mapped video 1455, as shown in FIG. 14. When the at least one configured tone mapping function that is applied to the video data includes at least two tone mapping functions, the processor can generate a tone mapped video by mixing the outputs of the at least two tone mapping functions according to a mixing ratio, as shown in block 1545. For example, the processor can include the mixer 235 of FIG. 2.

Although FIG. 15 illustrates one example method 1500 for tone mapping, various changes may be made to FIG. 15. For example, while shown as a series of steps, various steps in FIG. 15 could overlap, occur in parallel, occur in a different order, or occur any number of times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for tone mapping, the method comprising:
   configuring, by at least one processor, at least one tone mapping function based on a measure of a distribution of luminance values within video data, the measure representing a luminance level $I_p$ at which a predetermined percentage of pixels of the video data have luminance values satisfying a threshold condition, wherein configuring includes adjusting the at least one tone mapping function such that when a luminance value of an input is less than the luminance level $I_p$, a first tone mapping sub-function is applied to the input, and when the luminance value of the input is greater than the luminance level $I_p$, a second tone mapping sub-function is applied to the input, such that an output of the at least one tone mapping function is dynamically changed based on the measure of the distribution of luminance values within the video data; and
   generating a tone mapped video by applying the at least one configured tone mapping function to the video data.

2. The method of claim 1, further comprising:
   in response to determining that a maximum luminance level of the video data satisfies a tone mapping criterion, selecting to generate the tone mapped video and commencing the generation of the tone mapped video.

3. The method of claim 1, wherein:
   the at least one tone mapping function includes at least two tone mapping functions; and
   the method further comprises:
      determining a mixing ratio based on an amount of the video data that has luminance values within a predetermined range, wherein the mixing ratio represents a proportion of each of output of the at least two tone mapping functions, and
      mixing the outputs of the at least two tone mapping functions according to the mixing ratio to generate the tone mapped video.

4. The method of claim 1, further comprising:
   calculating the measure of the distribution of luminance values within the video data.

5. The method of claim 1, further comprising:
   accessing metadata linked to the video data to obtain the measure of the distribution of luminance values within the video data.

6. The method of claim 1, wherein the configuring of the at least one tone mapping function further comprises:
   configuring the at least one tone mapping function based on metadata linked to the video data, wherein the metadata includes at least one of:
      a maximum frame average luminance level, and
      a maximum intensity of a mastering display.

7. The method of claim 1, wherein the measure of a distribution of luminance values within the video data includes a measure of a distribution of luminance values within a group of frames of a same scene within the video data.

8. An apparatus for tone mapping, the apparatus comprising:
   at least one processor configured to:
      configure at least one tone mapping function based on a measure of a distribution of luminance values within video data, the measure representing a luminance level $I_p$ at which a predetermined percentage of pixels of the video data have luminance values satisfying a threshold condition, wherein configuring includes adjusting the at least one tone mapping function such that when a luminance value of an input is less than the luminance level $I_p$, a first tone mapping sub-function is applied to the input, and when the luminance value of the input is greater than the luminance level $I_p$, a second tone mapping sub-function is applied to the input, such that an output of the at least one tone mapping function is dynamically changed based on the measure of the distribution of luminance values within the video data; and
      generate a tone mapped video by applying the at least one configured tone mapping function to the video data.

9. The apparatus of claim 8, wherein the at least one processor is further configured to, in response to a determination that a maximum luminance level of the video data satisfies a tone mapping criterion, select to generate the tone mapped video and commence the generation of the tone mapped video.

10. The apparatus of claim 8, wherein:
    the at least one tone mapping function includes at least two tone mapping functions; and
    the at least one processor is further configured to:
       determine a mixing ratio based on an amount of the video data that has luminance values within a predetermined range, wherein the mixing ratio represents a proportion of each of output of the at least two tone mapping functions, and
       mix the outputs of the at least two tone mapping functions according to the mixing ratio to generate the tone mapped video.

11. The apparatus of claim 8, wherein the at least one processor is further configured to, calculate the measure of the distribution of luminance values within the video data.

12. The apparatus of claim 8, wherein the at least one processor is further configured to, access metadata linked to the video data to obtain the measure of the distribution of luminance values within the video data.

13. The apparatus of claim 8, wherein the at least one processor is further configured to configure the at least one tone mapping function based on metadata linked to the video data, wherein the metadata includes at least one of:
    a maximum frame average luminance level, or
    a maximum intensity of a mastering display.

14. The apparatus of claim 8, wherein the measure of a distribution of luminance values within the video data includes a measure of a distribution of luminance values within a group of frames of a same scene within the video data.

15. A non-transitory computer readable medium embodying a computer program, the computer program comprising computer readable program code that, when executed, causes at least one processing device to:
    configure at least one tone mapping function based on a measure of a distribution of luminance values within video data, the measure representing a luminance level $I_p$ at which a predetermined percentage of pixels of the video data have luminance values satisfying a threshold condition, wherein configuring includes adjusting the at least one tone mapping function such that when a luminance value of an input is less than the luminance level $I_p$, a first tone mapping sub-function is applied to the input, and when the luminance value of the input is greater than the luminance level $I_p$, a second tone mapping sub-function is applied to the input, such that an output of the at least one tone mapping function is dynamically changed based on the measure of the distribution of luminance values within the video data; and generate a tone mapped video by applying the at least one configured tone mapping function to the video data.

16. The non-transitory computer readable medium of claim 15, wherein the computer program further comprises computer readable program code that, when executed, causes the at least one processing device to in response to determining that a maximum luminance level of the video data satisfies a tone mapping criterion, select to generate the tone mapped video and commence the generation of the tone mapped video.

17. The non-transitory computer readable medium of claim 15, wherein:
the at least one tone mapping function includes at least two tone mapping functions; and
the computer program further comprises computer readable program code that, when executed, causes the at least one processing device to:
determine a mixing ratio based on an amount of the video data that has luminance values within a predetermined range, wherein the mixing ratio represents a proportion of each of output of the at least two tone mapping functions, and
mix the outputs of the at least two tone mapping functions according to the mixing ratio to generate the tone mapped video.

18. The non-transitory computer readable medium of claim 15, wherein the computer program further comprises computer readable program code that, when executed, causes the at least one processing device to calculate the measure of the distribution of luminance values within the video data.

19. The non-transitory computer readable medium of claim 15, wherein the computer program further comprises computer readable program code that, when executed, causes the at least one processing device to access metadata linked to the video data to obtain the measure of the distribution of luminance values within the video data.

20. The non-transitory computer readable medium of claim 15, wherein the computer program further comprises computer readable program code that, when executed causes, the at least one processing device to:
configure the at least one tone mapping function based on metadata linked to the video data, wherein the metadata includes at least one of:
a maximum frame average luminance level, or
a maximum intensity of a mastering display.

* * * * *